(12) United States Patent
Goodsitt et al.

(10) Patent No.: US 12,501,345 B2
(45) Date of Patent: **\*Dec. 16, 2025**

(54) EVENT-BASED MODIFICATION OF PERSONAL DEVICE SETTINGS

(71) Applicant: Capital One Services, LLC, McLean, VA (US)

(72) Inventors: Jeremy Goodsitt, Champaign, IL (US); Vincent Pham, Seattle, WA (US); Austin Walters, Savoy, IL (US)

(73) Assignee: Capital One Services, LLC, McLean, VA (US)

( \* ) Notice: Subject to any disclaimer, the term of this patent is extended or adjusted under 35 U.S.C. 154(b) by 69 days.

This patent is subject to a terminal disclaimer.

(21) Appl. No.: 18/424,320

(22) Filed: Jan. 26, 2024

(65) Prior Publication Data

US 2024/0172091 A1 May 23, 2024

Related U.S. Application Data

(63) Continuation of application No. 17/346,363, filed on Jun. 14, 2021, now Pat. No. 11,930,441.

(51) Int. Cl.
*H04W 48/04* (2009.01)
*G06F 12/14* (2006.01)
*H04W 4/02* (2018.01)
*H04W 4/029* (2018.01)
*H04W 12/041* (2021.01)

(52) U.S. Cl.
CPC ........ *H04W 48/04* (2013.01); *G06F 12/1408* (2013.01); *H04W 4/025* (2013.01); *H04W 4/029* (2018.02); *H04W 12/041* (2021.01)

(58) Field of Classification Search
None
See application file for complete search history.

(56) References Cited

U.S. PATENT DOCUMENTS

2016/0156621 A1\* 6/2016 Thom ................... H04L 9/0897
713/175

\* cited by examiner

*Primary Examiner* — German Viana Di Prisco
(74) *Attorney, Agent, or Firm* — Banner & Witcoff, Ltd.

(57) ABSTRACT

Aspects described herein may relate to systems and methods for automatically adjusting user device settings when a user attends an event or otherwise brings a user device into a context in which an automatic adjustment of settings is appropriate. By providing for automatic adjusting of user device settings, the systems and methods may achieve greater compliance with rules and other policies of airlines, performance venues, schools, and/or other entities associated with events and/or contexts in which user device settings should be adjusted. Aspects described herein may allow for automatic adjustment of user device settings without compromising a user's privacy, security, or control of a user device.

20 Claims, 3 Drawing Sheets

EVENT-BASED MODIFICATION OF PERSONAL DEVICE SETTINGS

CROSS-REFERENCE TO RELATED APPLICATIONS

This application claims priority to U.S. patent application Ser. No. 17/346,363, filed Jun. 14, 2021, and entitled "Event-Based Modification of Personal Device Settings." The prior application is herein incorporated by reference in its entirety for all purposes.

FIELD OF USE

Aspects of the disclosure relate generally to search and information systems and more specifically to systems that automatically adjust user device settings in particular contexts.

BACKGROUND

There are many situations in which user devices such as cellular phones and other mobile devices should be silenced, have features deactivated, or otherwise have settings adjusted. However, many users forget or otherwise fail to adjust their device settings when it is necessary or polite to do so. There is a need to provide mechanisms that can assist users in remembering to adjust their device settings in certain contexts and/or otherwise incentivize users who do not wish to adjust their device settings in certain contexts.

Aspects described herein may address these and other problems without compromising user control over user devices, user privacy, or device security.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may allow for automatically adjusting user device settings when the user attends a particular event, such as a flight, performance, class, or other type of event where adjusting a device's settings is required and/or desired. More broadly, aspects described herein may allow for automatically adjusting user device settings whenever a user is in an appropriate context. This may have the effect of improving device functionality by removing the need for users to remember when they should or must change their device settings, and/or reminding the users that they should or must change their device settings, thereby bringing new functionalities to user devices and improving existing functionalities of user devices.

More particularly, some aspects described herein may provide a computer-implemented method for determining, by an application running on a mobile device, that a user of the mobile device is scheduled to attend an event. Then, in response to the determining, the method may include requesting, by the application running on the mobile device and from a data server, encryption information for the event, and then storing, by the mobile device, the encryption information in secure storage of the mobile device. The method may further comprise receiving, by the mobile device, from a wireless transmitter at a location of the event, a signal comprising an encrypted command, and decrypting, by the application running on the mobile device, using the encryption information, the encrypted command, wherein the command includes an instruction to change a setting of the mobile device. The method may then comprise changing, based on the instruction, the setting of the mobile device.

According to some aspects described herein, the event may be a flight, the application may be an application associated with an airline company, and the instruction to change the setting may be an instruction to set the mobile device to an airplane mode. Additionally and/or alternatively, the event may be a performance, the application may be a ticketing application, and the instruction to change the setting may be an instruction to set the mobile device to silent.

According to some aspects described herein, prior to changing the setting, the method may include displaying a notification that the setting will be changed, receiving a confirmation from the user of the mobile device, and preventing the setting from being changed again for a duration of the event. Additionally and/or alternatively, the method may include generating an encryption key based on the encryption information and a current time, and the decrypting of the encrypted command using the encryption information may comprise decrypting the encrypted command using the generated encryption key.

According to some aspects described herein, in response to the determining that the user of the mobile device is scheduled to attend an event, the method may comprise requesting, by the application running on the mobile device, permission to adjust the setting of the mobile device. According to some aspects, the encryption information may be received via a location-based push notification.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
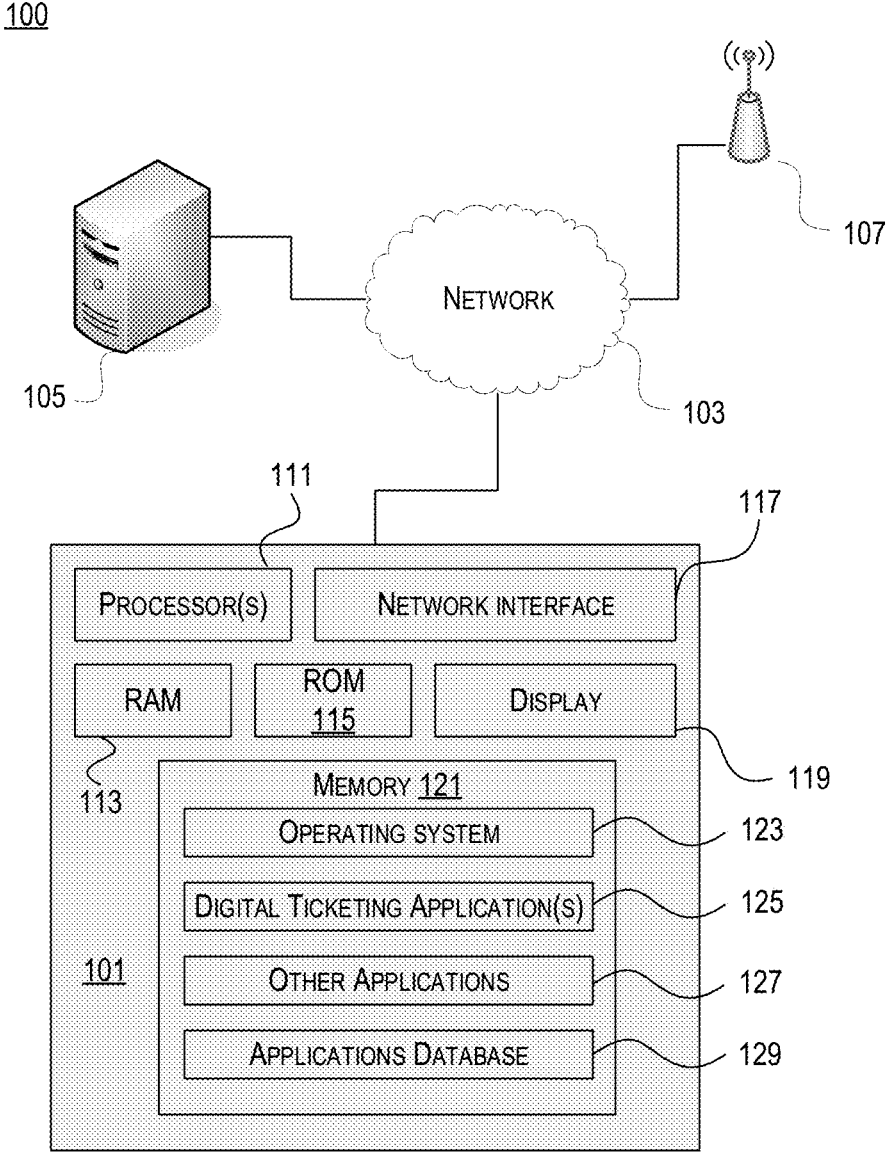
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for automatically adjusting user device settings when the user attends an event or otherwise brings a user device into a context in which an automatic adjustment of settings is appropriate. The aspects discussed herein may find particular benefit when applied to airline flights, where laws, regulations, and/or airline rules may require users to adjust their devices into an airplane mode. Similarly, the aspects discussed herein may find particular benefit when applied to meetings, classrooms, performances such as movies, concerts, or other situations where it is required and/or polite to mute or otherwise adjust a user device. By providing for automatic adjusting of user device settings, the systems and methods described below may achieve greater compliance with rules and/or policies of airlines, venues, schools, and/or other entities associated with events and/or contexts in which user device settings should be adjusted.

Aspects described herein may allow for automatic adjustment of user device settings without compromising a user's privacy, security, or control of a user device. To prevent unauthorized use and abuse of a feature that may allow a device's settings to be automatically adjusted, devices may be configured to only automatically adjust settings when they receive encrypted commands that can only be decrypted using a key associated with the user device. Such encrypted commands may be received by user devices from transmitters stationed at appropriate locations where user device settings should be adjusted (e.g., in an airplane, at a movie theater), which may transmit the encrypted commands in broadcast signals that can be received by many devices. Along similar lines, applications of a user device may only be able to automatically adjust user device settings if a user provides the applications with permissions to do so, thus ensuring that a user maintains control over a user device.

To encourage users to allow their applications and/or devices to automatically adjust settings (e.g., by providing permissions to applications that can detect a user is at an event and adjust a setting), systems and methods described herein may provide enhanced application functionality when a user provides permissions to an application with the ability to automatically adjust one or more settings when an encrypted command is received. For example, a ticketing application may reduce and/or refund a cost of a user ticket if a user provides the ticketing application with permissions for automatically adjusting the user's device settings, may only display a digital ticket if a user enables the permissions, or may provide other such incentives to encourage users to allow automatic adjustments of settings. To prevent applications from abusing such permissions and otherwise improve security, a user device may provide a permissions framework that allows time-, location-, and/or otherwise context-sensitive permissions to be granted, such that an application only has permission to automatically adjust user device settings when the device is in the right time, place, and/or other context.

The techniques described herein improve the functioning of computers by providing new functionalities for automatically adjusting user device settings, including automatic and context-sensitive adjustment of user device settings, in a secure way. These new functionalities may be made secure through the use of cryptography and an improved framework for permissions that only allows applications to change device settings in certain contexts. These features, and the other features described below, thus represent an advancement to the arts of user device interfaces, automatic and contextual device configurations, and device permissions frameworks. Techniques described below also provide for efficiently integrating each of these advancements in a system and/or method that securely provides new functionalities.

FIG. 1 shows a system 100. The system 100 may include a plurality of devices including a user device 101, one or more data server(s) 105, and one or more wireless signal transmitter(s) 107 in communication via a network 103. It will be appreciated that the network connections shown are illustrative and any means of establishing a communications link between the devices may be used. The existence of any of various network protocols such as TCP/IP, Ethernet, FTP, HTTP and the like, and of various wireless communication technologies such as GSM, CDMA, Wi-Fi, and LTE, is presumed, and the various computing devices described herein may be configured to communicate using any of these network protocols or technologies.

The data server(s) 105 may include devices that provide information about event and/or other contexts in which user device settings should be automatically adjusted. Information stored by the data server(s) 105 may include time, place, and/or other contextual information about events, encryption information that may be used to encrypt and/or decrypt commands for automatically adjusting device settings, ticketing information for allowing a user to purchase and/or retrieve tickets for an event, and other such information, which may be stored in one or more database of the data server(s) 105. Such databases include, but are not limited to, relational databases, hierarchical databases, distributed databases, in-memory databases, flat file databases, XML databases, NoSQL databases, graph databases, and/or a combination thereof. The user device 101 a device owned and/or operated by a user that will attend an event or other context in which a user device setting should be adjusted, and thus may be any type of mobile device or other device that a user may bring to an event or the like. The network 103 may include a local area network (LAN), a wide area network (WAN), a wireless telecommunications network, and/or any other communication network or combination thereof.

The wireless signal transmitter(s) 107 may include various devices that may transmit event data and other information from the data server(s) 105 and/or from other sources to the user device 101. The wireless signal transmitter(s) may use any type of wireless transmission to connect to the user device 101, including RF signals, modulated audio signals (e.g., an ultrasonic acoustic signal), or other types of wireless signals capable of carrying information. The data carried by the wireless signals may be formatted according to any type of wireless transmission protocol.

The data transferred to and from various computing devices in a system 100 may include secure and sensitive data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (STEP), and/ or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

The user device 101 may be used to implement one or more of the techniques described herein. The user device 101 may include one or more processor(s) 111 for controlling overall operation of the user device 101 and its associated components, including RAM 113, ROM 115, input/output device 119, network interface 117, and/or memory 121. A data bus may interconnect processor(s) 111, RAM 113, ROM 115, memory 121, I/O device 119, and/or network interface 117. In some embodiments, the user device 101 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Software may be stored within memory 121 to provide instructions to processor(s) 111 to allow the user device 101 to perform various actions. For example, memory 121 may store various applications and other software used by the user device 101, such as an operating system 123, one or more event applications 125, one or more other applications 127, and an applications database 129. The various hardware memory units in memory 121 may include volatile and nonvolatile, removable and non-removable media implemented in any method or technology for storage of information such as computer-readable instructions, data structures, program modules, or other data. Memory 121 may include one or more physical persistent memory devices and/or one or more non-persistent memory devices. Memory 121 may include, but is not limited to, random access memory (RAM) 113, read only memory (ROM) 114, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor(s) 111.

Network interface 117 may include one or more transceivers, digital signal processors, and/or additional circuitry and software for communicating via any network, wired or wireless, using any protocol as described herein.

The processor(s) 111 may include a single central processing unit (CPU), which may be a single-core or multi-core processor, or may include multiple CPUs. The processor(s) 111 and associated components may allow the user device 101 to execute a series of computer-readable instructions to perform some or all of the processes described herein. Although not shown in FIG. 1, various elements within memory 121 or other components in user device 101 may include one or more caches, for example, CPU caches used by the processor(s) 111, page caches used by the operating system 123, disk caches of a hard drive, and/or database caches used to cache content from database 131. For embodiments including a CPU cache, the CPU cache may be used by one or more processors 111 to reduce memory latency and access time. A processor 111 may retrieve data from or write data to the CPU cache rather than reading/writing to memory 121, which may improve the speed of these operations. In some examples, a database cache may be created in which certain data from a database 129 is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of the user device 101 are described separately, functionality of the various components may be combined and/or performed by a single component and/or multiple computing devices in communication without departing from the invention.

The data server(s) 105, wireless signal transmitter(s) 107, and/or other devices (not shown) may have similar or different architecture as described with respect to user device 101. Those of skill in the art will appreciate that the functionality of user device 101 (or the data server(s) 105, wireless signal transmitter(s) 107, and/or other devices) as described herein may be spread across multiple data processing devices, for example, to distribute processing load across multiple computers, to segregate transactions based on geographic location, user access level, quality of service (QoS), etc.

Figure 2:
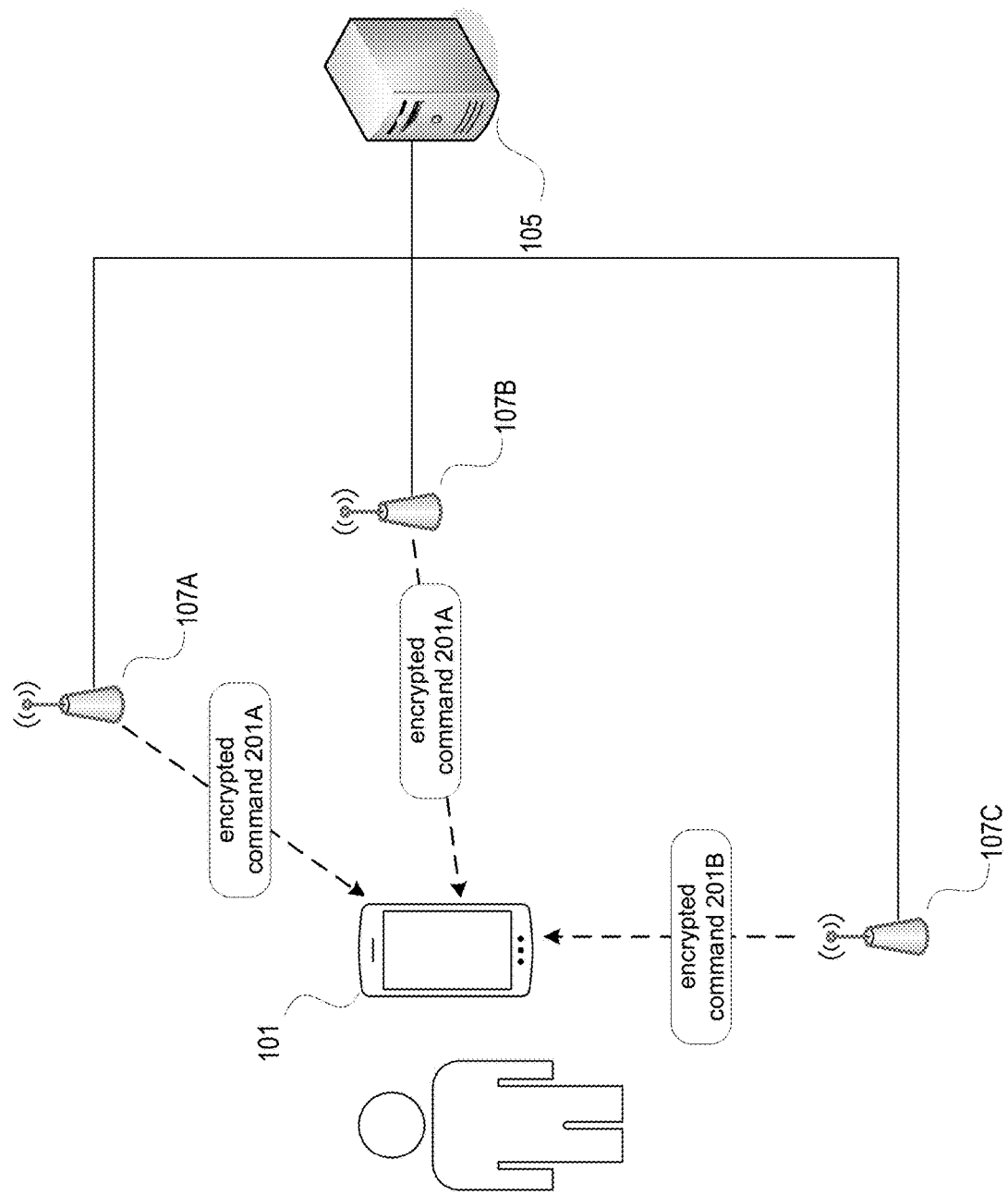
FIG. 2 shows an example environment in which one or more aspects described herein may be implemented.

FIG. 2 shows an example environment in which one or more aspects described herein may be implemented. As shown in FIG. 2, an example environment may include multiple wireless signal transmitter(s) that may be in wireless communication (shown as a dashed line) with a user device 101 carried by a user. The multiple wireless signal transmitter(s) may broadcast and/or transmit the same or different information to the user device 101. Multiple wireless transmitters 107 may broadcast the same information in order to provide better wireless coverage at a particular location (e.g., at a large event venue). Other wireless transmitters 107 may broadcast and/or transmit different wireless information in order to provide different functionality. In the illustrated example, a first wireless signal transmitter 107A may transmit a first encrypted command 201A, a second wireless signal transmitter 107B may transmit the first encrypted command 201A, and a third wireless signal transmitter 107C may transmit a second encrypted command 201B.

The wireless signal transmitter(s) may obtain the information they broadcast and/or transmit to the user device 101 from data server(s) 105. For example, as shown in FIG. 2, each of the wireless signal transmitters 107 may be connected via a wired connection (shown as a solid line) to a data server 105, which may be in another location. The data server 105 may provide the encrypted commands 201A, 201B and/or information for generating the encrypted commands 201A, 201B to the wireless signal transmitter(s), which may cause the encrypted commands to be transmitted wireless to the user device 101.

The wireless signal transmitter(s) 107 may broadcast information to a plurality of user devices besides user device 101. By broadcasting information to a plurality of user devices, the system may beneficially cause the plurality of user devices to all adjust settings where appropriate (e.g., on a flight where all devices must be adjusted into airplane mode). Thus, as explained below, the encrypted commands may be broadcast such that any user device at a location of an event may receive and (if the user device has the key) decrypt the command. The wireless signal transmitter(s) may repeatedly broadcast information such that, as users with their user devices arrive at an event, the user device receives the repeating broadcast and, if the user device has the correct encryption key, can decrypt the received command. Repeated broadcasts may also be used to signal that an event is ongoing and a setting should not be re-adjusted (e.g., a device should not be taken out of airplane mode), as explained in detail below.

Additionally and/or alternatively, the wireless signal transmitter(s) 107 may transmit information to a single device or group of devices. By broadcasting information to a single device or group of devices, the system may provide more fine-tuned adjustment of settings at an event (e.g., allowing for exceptions to a blanket policy). For example, the third wireless signal transmitter may add a unicast and/or multicast address to the transmission of the second encrypted command 201B in order to cause only the user device 101, or a multicast group including the user device 101, to receive the second encrypted command Thus, certain commands may be sent to all devices, and certain commands may be sent to only certain devices.

Figure 3:
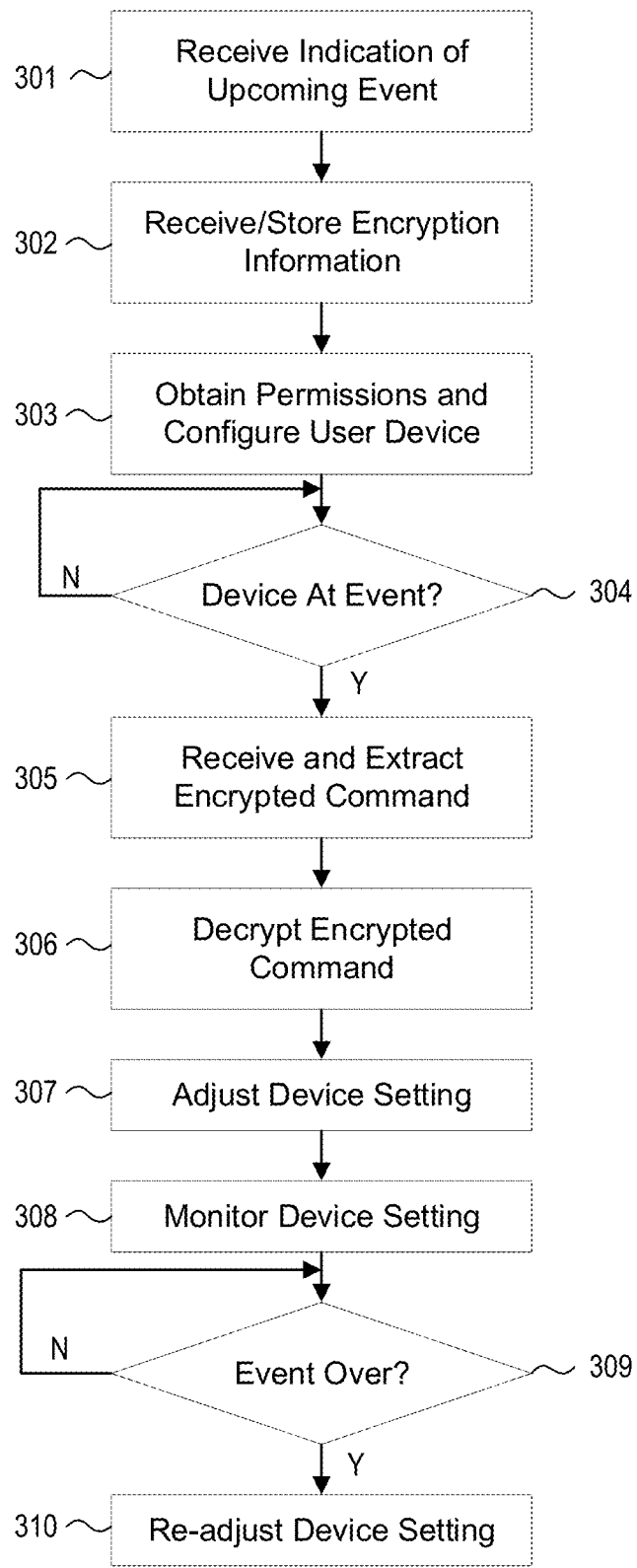
FIG. 3 shows a flow chart of a process for configuring a user device to received, decrypt, and execute one or more commands for adjusting device settings at an event according to one or more aspects of the disclosure.

FIG. 3 illustrates a process for configuring a user device to received, decrypt, and execute one or more commands for adjusting device settings at an event. As discussed above, at the beginning of certain events (e.g., flights, concerts, movies, classes), an event venue, air carrier, school, or other entity may request that users adjust certain settings and other otherwise configure their devices for the event (e.g., by setting their phones into airplane mode, silent mode, or the like). Configuring the user device to automatically receive and decrypt a command to adjust such a setting allows for user control over a user device and keeps the user device secure from unauthorized adjustment of settings.

At step 301, an event application 125 running on the user device 101 may receive an indication that the user will attend an upcoming event. For example, a user may sign up for, register for, purchase a ticket for, and/or schedule the upcoming event via the event application 125 or on a website or other computing system in communication with the event application 125. As more specific examples, the user may purchase a flight ticket via an airline or travel application, may purchase a ticket to a performance, sporting event, museum, or other event via a ticket sales application, may save a digital ticket in a digital wallet application, or may otherwise indicate a desire to attend a future performance.

The user may use the event application 125 to select and/or configure information about the event (e.g., by selecting a flight, selecting a date and/or time of a performance, selecting a night and location of a concert, and the like), purchase any necessary ticket, provide user credentials, and otherwise interact with the application to set up the event. Thus, the event application 125 may receive the indication that the user will attend the upcoming event based on one or more user interactions with the event application 125 (e.g., the user selecting one or more option(s) to purchase a ticket).

Additionally and/or alternatively, the event application 125 may receive the indication that the user will attend the upcoming event via a data server 105 associated with a ticketing agent, event provider, and/or a third party. For example, a user may receive a confirmation message containing details about an upcoming flight or some other event. A messaging application (e.g., email application) may be configured to recognize the message and/or information in the message that contains the details of the event either automatically and/or upon user selection of the information (e.g., by selecting a link). The messaging application may be an example of event application 125 that executes the method, and/or may transfer information about the upcoming event to another application that is the event application 125. As a more specific example, after purchasing a ticket and/or registering for an upcoming event, a computing device associated with the event and/or a ticketing service may send to the user device (e.g., via a message and/or notification) digital ticket information that may be transferred to a digital wallet application of the user device. The user may select the digital ticket information to transfer the digital ticket information to the digital wallet application, and/or the user's device may automatically recognize the digital ticket information and transfer it to the digital wallet application. The digital wallet application may be the event application 125 and may continue executing the method.

As another example, after purchasing the ticket and/or registering for the upcoming event, the user device may receive a calendar appointment containing information about the event. The calendar application may be the event application 125 and may store the calendar appointment on the user's calendar. Additionally and/or alternatively, the calendar application may transfer the event information to another application that is the event application 125 (e.g., to a digital wallet application or some other event application 125).

Prior to or after the event application 125 receives an indication that the user will attend an upcoming event, it may provide a notification or display message to a user indicating that one or more settings may be adjusted for the event. For example, before a user purchases a ticket via the event application 125, the event application 125 may display a warning that one or more settings should or must be adjusted at the event, that particular incentives may be provided if the settings are adjusted (e.g., a discount or refund of the purchase price), that particular penalties may be applied if the settings are not adjusted, or the like. As another example, after the event application 125 receives an indication that a user is registered for the event, it may display a warning that one or more settings should or must be adjusted at the event, that particular incentives may be provided if the settings are adjusted, that particular penalties may be applied if the settings are not adjusted, etc.

At step 302, the event application 125 that received the information about the upcoming event (e.g., the digital ticket information) may configure the user device for the upcoming event by receiving and/or downloading encryption key information that may be used to decrypt an encrypted command at the time of the event, and storing the encryption key information.

The event application 125 may obtain the encryption key information by requesting the encryption key information from a data server 105 (e.g., using information associated with the event that was received at step 301) and/or by receiving a message pushed to the user device (e.g., via a notification service) by the data server 105. The data server 105 may require the user device 101 to provide some form of credential(s) before it transmits the encryption key information to the user device 101. For example, the data server 105 may request that the user log in to a user account associated with the event (e.g., the user may have to log into an account associated with an airline prior to receiving encryption information for an upcoming airplane ticket, or may have to log into an account for a ticketing application prior to receiving an encryption key for an upcoming ticketed event), and after the user logs in, the data server 105 may respond to the user login by providing the encryption key information to the user device 101. Additionally and/or alternatively, when the user purchases a ticket and/or otherwise registers for an upcoming event, the user may provide a phone number, email address, or other identifying information for receiving data at the user device 101, which may be used by the data server 105 to provide a push notification, email message, or other transmission that includes the encryption key information.

The user device 101, upon receiving the encryption key information, may store it in a secure storage area of the user device. For example, event application 125 may store the encryption key information in an application-specific area of the applications database 129. The operating system 123 of the user device 101 may provide secure memory that may be reserved for a particular application (e.g., the event application 125) and that cannot be accessed by other applications, other users of the device, or the like.

The encryption key information may comprise an encryption key and/or information for generating an encryption key. The encryption key may be a symmetric key, a public key, a private key, or any other type of encryption key that may be used to decrypt an encrypted command Additionally and/or alternatively, the encryption key information may comprise information for generating an encryption key at the user device, such as a random seed and/or other information for generating an encryption key.

At step 303, the event application 125 may configure the user device for the event by obtaining any necessary permissions to execute the command. The event application 125 thus may transmit a request, to the operating system 123, for one or more permission(s) that may be required to executed a particular command at the time of the event. The operating system 123 may then request that a user of the user device 101 confirm or deny the request for one or more permission(s). For example, for a flight event, the user device 101 may receive a command to set the device into airplane mode, and therefore the event application 125 may request permission to set the phone into airplane mode. As another example, for an event associated with a performance, the user device 101 may receive a command to set the device into a silent mode, and therefore the event application 125 may request permission to set the phone into silent mode. As a third example, for an event associated with a sporting or music event, the user device 101 may receive one or more command(s) to turn on the device's light, and therefore the event application 125 may request permission to turn on the device's light.

Additionally and/or alternatively, the event application 125 may request permission(s) to access one or more devices and/or sensors for receiving a signal from one or more wireless signal transmitter(s) 107 that may be located at the site of the event. For example, the event application 125 may request permission(s) to access a microphone to receive an audio signal, may request permission(s) to access an antenna to receive RF signal(s), may request permission(s) to access a Bluetooth module to receive Bluetooth signals, and the like. As another example, the event application 125 may request permission(s) to access an accelerometer of the device so that the event application 125 may detect when a user device is taking off for an airplane flight. As another example, the event application 125 may request permission(s) to access a location service (e.g., a GPS receiver) so that the event application 125 may access a location of the user device during the event.

The event application 125 may provide one or more incentives for the user to provide the requested permission(s). For example, the event application 125 may only display a digital ticket after the user provides the requested permission(s) (e.g., the user may need to print a paper ticket if they do not wish to accept the permission(s)). As another example, the user may be offered a monetary incentive (e.g., a discount on the cost of a ticket and/or a partial refund of the cost of the ticket) or some other incentive (e.g., a free beverage or some other item) if the user provides the event application 125 with the requested permission(s). As such, the event application 125 may cause the user device 101 to display information about the one or more incentives either separately from and/or with the request to modify the application permission(s) in order to configure the device for the upcoming event.

In some cases, an operating system 123 of the user device 101 may allow an application to request time- and/or context-dependent permissions. For example, the event application 125 may request one or more permission(s) for a limited time period corresponding to one or more time(s) of the event. As a specific example, if the event is a flight scheduled for a certain day and time, the event application 125 may request permission to set the user device 101 into airplane mode for the duration of the flight, between the scheduled takeoff time and the scheduled landing time. Additionally and/or alternatively, the event application 125 may request permission(s) for a period that begins a certain amount of time before the scheduled beginning of the event (e.g., 15 minutes prior to a scheduled start to account for an early start) and/or that ends a certain amount of time after the scheduled ending of the event (e.g., 2 hours after a scheduled ending, or some other time period selected to account for potential delays).

Additionally and/or alternatively, the operating system 123 may provide a function that allows an application to request permission(s) when a user device is at a particular location (e.g., a location corresponding to an airport, event venue, etc.), when the user device receives a particular signal (e.g., a beacon signal broadcast by a wireless signal transmitter 107 that may be stationed on an airplane, in an event venue, etc.), or based on any other context. Thus, for example, the event application 125 may request context-dependent permission(s) that may allow the application to set the user device into an airplane mode when the user device 101 is at the airport, when the user device 101 has receiving a beacon signal from within the aircraft cabin in the last 5 minutes, and/or the like. Any of the permissions described above (e.g., permission(s) to adjust device settings, permission(s) to access a microphone, permission(s) to access an antenna, permission(s) to access an accelerometer, etc.) and/or any other permissions may be time- or context-dependent permissions, such that a user can better manage privacy and security on the user device 101 by allowing the event application 125 to adjust settings, listen for signals, and perform other functions requiring permissions at the correct time and/or place.

Additionally and/or alternatively to obtaining permissions, the event application 125 may configure the user device by registering the location and/or time of the event with a notification service that is configured to generate a notification when the user device is at a particular time and/or location or other context. The notification service may be a functionality provided by the operating system 123. For example, the event application 125 may provide a location of the event, a day of the event, a starting time of the event, and/or an ending time of the event to the notification service. The notification service will then generate an alert when the user device is nearby the location of the event and/or the event begins. The alert may cause activation of the event application 125 (e.g., so that the application may display the digital ticket information and perform additional steps according to the process of FIG. 3 during the event). The event application 125 may obtain details of the event location, event start time, event end time, event duration, and other such details from the data server 105.

At decision 304, the user device 101 may wait until receiving an indication that the user device is at a time and/or place of the event. The indication may be a received signal broadcast by a wireless signal transmitter 107 (e.g., a device that emits a short range beacon signal) placed at the site of the event, a GPS signal indicating that the user is at a location of the event, a push notification from a data server 105 associated with the event, or any other signal data received by the user device 101.

An event venue (e.g., an aircraft, stadium, concert venue, etc.) may place one or more wireless signal transmitters 107 at the site of the event that broadcast signals on a continuous, repeating, and/or occasional basis, as shown and discussed for FIG. 2. The signals may be relatively short-range signals that may be detected by a user device when the user device is relatively near to the signal transmitter. The signal may be an electromagnetic signal, an audio signal (e.g., an ultrasonic acoustic signal), or any other wired or wireless signal.

The event application 125 may be configured to detect and receive the signal. For example, when a user opens and/or otherwise activates the event application 125 to display a digital ticket, details about the event, and/or other information, the event application 125 may listen for a signal. The event application 125 may activate a microphone of the device to listen for an audio signal (e.g., an ultrasonic signal), may access a short-range wireless module (e.g., a Bluetooth™ module) of the device to receive short-range wireless signals, and/or may access other functionality of the device to receive one or more signals from the wireless signal transmitter 107. Additionally and/or alternatively, the user device 101 may allow the event application 125 to run in the background so that it may continuously listen for a signal from a wireless signal transmitter 107.

The user device 101 may also receive the indication that the user device is at a time and/or place of the event based on a notification generated by a notification service, as discussed above. For example, a notification service may continually monitor a location of the user device, and may generate notifications when the user device is near a certain location and/or certain other criteria are met (e.g., time-based criteria). The notifications may display a message to the user, automatically activate an event application 125, provide a link that, upon selection, activates the event application 125, and/or perform other functions. Thus, the notification service may detect that a user device is at a time and/or place of the event and generate a notification that may activate the event application 125 and/or request that the user select a link to activate the event application 125. An example message displayed to the user before a concert may state "The show is starting soon. Click here to open your ticketing application, display your digital ticket, and configure your device for the show." Similar messages may be displayed for other types of events.

Additionally and/or alternatively, the user device 101 may detect that the user is at the event based on a signal received in response to the user scanning a ticket or otherwise checking into the event. For example, when the user scans a digital ticket displayed on the user device, a data server 105 connected to a ticket scanner may detect that the user is at the event and send a notification to the user device 101. This functionality may be used as a backup to the location and/or time-based determination that the user is at an event. For example, if a user device does not know its current location because the user has disabled a GPS functionality, then after the user scans a digital ticket, the user device may receive a notification that the user device is at the event from the server.

Other types of signals and/or sensor(s) may be used to determine that the user device is at a time and/or place of the event. For example, if a flight application is configured with permission(s) to access an accelerometer of the device, then the flight application may detect a sharp spike in acceleration corresponding to takeoff, and may then detect that a flight has started. As another example, if a concert venue or movie ticketing application has permission(s) to access a light sensor, it may detect that the lights have been dimmed and a show, movie, etc., is about to begin.

Multiple signals may be used to determine that the user device is at a time and/or place of an event. For example, a user device 101 may receive a signal from a wireless transmitter 107 aboard an aircraft, but may wait until it detects an accelerometer signal indicating the user is taking off before proceeding with the process and adjusting any setting. Other combinations of signals (i.e., any combination of the signals disclosed above) may be used to detect that a user device is at a time and/or place of an event.

In some cases, the event application 125 may adjust one or more settings immediately after detecting that the device is about to begin and/or has begun. Additionally and/or alternatively, the device may adjust certain settings only after receiving an encrypted command, decrypting the command using encryption key information stored at step 302, and then adjusting the setting based on the encrypted command. Thus, although step 305 and 306 (as detailed below) describe the process of receiving and/or extracting an encrypted command and then decrypting the encrypted command before adjusting settings at step 307, in some cases steps 305 and 306 may be unnecessary and the event application 125 may have permission to adjust one or more setting(s) (e.g., as described at step 307) without receiving and decrypting a command.

At step 305, the event application 125 and/or the user device 101 may receive and/or extract an encrypted digital command. The encrypted digital command may be modulated and/or embedded within a signal received at decision 304, may be received as part of a separate signal from the signal received at decision 304 (e.g., on a separate frequency or time slot, transmitted by a separate wireless signal transmitter 107, etc.), and/or may be retrieved by the user device 101 in response to receiving the indication that the user device 101 is at the time and/or place of the event.

For example, an audio signal received by a microphone of the user device 101 (e.g., an ultrasonic signal as described above) may be modulated with the encrypted command. The event application 125 may access the microphone, analyze the audio data for a modulated signal being transmitted by a wireless signal transmitter 107 and received via the microphone, and then extract the modulated signal from the audio data received via the microphone. As another example, the event application 125 may access a short-range network interface (e.g., a Bluetooth interface) to detect a local signal being broadcast by a wireless signal transmitter 107, may detect the local signal, and may extract an encrypted command from the local signal.

The signal comprising the encrypted command may use a different transmission medium and/or format from the signal received at decision 304. For example, if the user device 101 uses a GPS signal to determine it is at a time and/or location of the event at decision 304, then the user device 101 may user a short-range wireless signal transmitted by the wireless transmitter(s) 107 to receive the encrypted command. The wireless transmitter(s) 107 may embed the encrypted command in a signal of any format. As one example, the wireless transmitter(s) 107 may embed the encrypted command in a spoofed GPS signal that may be received by a GPS module of the user device 101.

Additionally and/or alternatively, the user device 101 may retrieve an encrypted command from the data serve 105 when the user device detects that the user is at the event at decision 304. For example, in response to the notification service indicating that the user is at the event, the event application 125 may retrieve an encrypted command from a data server 105 associated with the event. The notification and/or other signal received at decision 304 may contain information indicating an address or other information for accessing the encrypted command. For example, a notification received at decision 304 may include an URL that, when selected, causes the user device to retrieve the encrypted command from the data server 105.

At step 306, the user device 101 and/or event application 125 may decrypt the encrypted command received at step 305. The encrypted command may be encrypted such that it may be decrypted using the encryption information received at step 302.

As noted above, an encryption key may be a symmetric key, a public key, a private key, or any other type of encryption key that may be used to decrypt an encrypted command. When asymmetric (e.g., public/private) cryptography is used, the encrypted command may be encrypted using a public key, and the user device may use a private key to decrypt it. When symmetric cryptography is used, the encrypted command may be encrypted with the same key used by the user device to decrypt the command.

As noted above, the encryption information may comprise information for generating an encryption key at the user device, such as a random seed and/or other information for generating a key. Accordingly, the user device 101 and/or the event application 125 may generate a key for decrypting the encrypted command. The key may be generated based on the encryption key information received at step 302 and/or other information, such as a current time.

At step 307, the event application 125 may cause the user device 101 to change a device setting. The decrypted command may indicate the setting to be changed. For example, if the event is a flight, the command may indicate that the user device 101 should go into an airplane mode. As another example, for an event associated with a performance, the decrypted command may indicate that the user device 101 should switch into a silent mode. As a third example, for an event associated with a sporting or music event, the decrypted command may turn on the device's light.

Some settings may need permissions to be changed. If the event application 125 lacks permissions to change a setting as instructed by the decrypted command (e.g., if a user did not provide permissions in step 302), then the event application 125 may again request that the user provide permissions. As above, the event application 125 may cause the user device 101 to display a prompt to the user, may offer one or more incentives for the user to accept the permissions, and the like.

If the event application 125 has permissions to change the setting, the event application 125 may use the permissions to change the setting. For example, the event application 125 may instruct the operating system 123 to adjust the setting of the user device 101.

At step 308, the event application 125 may monitor the user device to prevent a user from changing back the setting that was changed at step 305 for a particular period of time (e.g., for the duration of the event and/or a portion of the event). For example, if the user turns off airplane mode during the duration of the flight, the event application 125 may detect that the user has turned off the airplane mode, and turn it back on. Similarly, if the user turns off a silent mode of the device during a performance event, the event application 125 may detect the setting change and turn the user device's silent mode back on. Due to the permissions granted to the event application 125 as described above, the event application 125 may be able to continue controlling the device for the duration of the event.

Additionally and/or alternatively, the event application 125 may be able to block user access to the setting that was changed at step 305. For example, the event application 125 may be configured to leverage enterprise management or similar frameworks that allow a third party limited control over a user's device, at least temporarily. The user may need to provide authorization for the event application 125 to manage the user device using such frameworks and/or other functionalities. As described above in relation to the permissions, incentives may be provided to encourage a user to allow the event application 125 to manage the device during the event.

The user device may prohibit the event application 125 from blocking access to certain settings, and may override the event application 125's blocking of certain settings in certain situations. For example, the user device may prevent the event application 125 from controlling any setting that would interfere with the user's ability to dial an emergency number, for example. Additionally, the user device and/or the event application 125 may be able to detect certain situations where the event application 125's monitoring and/or control of settings should be returned to the user (e.g., if the user dials an emergency number) Similarly, the user device and/or event application 125 may provide a function (e.g., a selectable option on a screen displayed by the event application 125) that allows a user to revoke the event application 125's permissions if the user needs to access functionality being monitored and/or controlled by the event application 125.

Instead of or in addition to actively controlling user settings, the event application 125 may passively monitor whether a user complies with the settings adjustment(s) or overrides the settings adjustment(s) during the event. The event application 125 may also upload (e.g., to the data server 105) an indication of whether the user is no longer participating with the adjusted user setting(s). The data server 105 may gather data for many users that are attending the event, and use the data to award incentives. For example, users may only be awarded incentives (e.g., price refunds or other incentives as discussed above) if they do not override the adjusted setting for the duration of the event. Additionally and/or alternatively, any incentive may be prorated based on an amount of time for which the user is in compliance with the setting adjustment(s) that were instructed by the encrypted command(s).

The data server 105 may also track user compliance over a plurality of events in order to determine which users frequently adjust and maintain their settings as requested and/or required during an event. The data server 105 may use this information to provide additional incentives, penalties, or the like over long-term periods in order to award users for consistent compliance with settings adjustments. Additionally and/or alternatively, the data server 105 may gather user information (e.g., age or other demographics information, user purchase history information, etc.) that may indicate which users commonly adjust and maintain compliance with settings adjustments. The data server 105 may then use this use information to predict (e.g., using machine learning techniques such as a neural network trained on historical data correlating user information with user compliance) which types of users are most likely to comply with settings adjustments for future events. The data server 105 may use these predictions to provide additional information to some users (e.g., more information may be provided to users with a low predicted likelihood of compliance), additional incentives for some users (e.g., greater incentives may be provided to users with a low predicted likelihood of compliance), or otherwise perform actions to achieve greater compliance with settings adjustments for future events.

At decision 309, the event application 125 may detect that the event is over. The event application 125 may detect that the event is over based on one or more particular times. For example, if the event information (e.g., as obtained from data server 105 and/or indicated by a digital ticket, etc.) indicates that the starting time of the event is 8 PM and the duration of the event is two hours, then the event application 125 may detect that the event is over at 10 PM.

Additionally and/or alternatively, the event application 125 may detect that the event is over based on a signal from the wireless signal transmitter 107. This configuration may allow for more flexibility to deal with delays, early starts, or other potential changes than using time information. The wireless signal transmitter 107 may continue broadcasting signals during the event, which may be continually and/or periodically received by the user device throughout the event. The user device may then detect that the event is over when a signal from the wireless signal transmitter 107 has not been received in a certain amount of time (e.g., in the last five minutes). Additionally and/or alternatively, the wireless signal transmitter 107 may broadcast a signal indicating the end of the event, as discussed above. If the user device does not receive the end of event signal, then the event application 125 may still be configured to detect that the event is over after a certain amount of time has elapsed, which may depend on the event in question (e.g., more than three hours after the scheduled start of the event for a performance scheduled to last two hours).

At step 310, after detecting the end of the event, the event application 125 may change back the setting that was changed at step 305 and/or stop monitoring or controlling the setting. For example, the event application 125 may switch off the airplane mode, switch off the silent mode, or otherwise return the user device to the state it was in prior to the beginning of the event. The event application 125 may also signal to the user device that the permission to change a setting is no longer needed, and thus may disable a temporary permission that was provided by the user. Additionally and/or alternatively, the user device may revoke a temporary permission at a predetermined time when the temporary permission elapses (e.g., if a temporary permission was provided to the event application 125 for eight hours, the user device may revoke the permission after the eight hours elapses).

The process of FIG. 3 may be expanded to include any number of commands and/or settings that may be changed during an event as desired. For example, for an airplane flight, a wireless signal transmitter 107 may send a first encrypted command to a user device (e.g., at takeoff) that causes the user device to 1) enter an airplane mode and 2) disable a wireless network interface. Later (e.g., after takeoff), the wireless signal transmitter 107 may send a second encrypted signal that causes the user device to enable a wireless network interface while remaining in airplane mode. Next (e.g., before descent and landing), the wireless signal transmitter 107 may send a third encrypted signal that causes the user device to disable the wireless network interface and remain in airplane mode. And finally (e.g., after reaching a terminal), the wireless signal transmitter 107 may send a fourth encrypted signal that signals the end of the event and thus causes the user device to 1) turn off airplane mode and 2) re-enable a wireless network interface, and further causes the event application 125 to stop monitoring and/or controlling the airplane mode setting. Similarly, a wireless signal transmitter 107 at a theater or other performance may send multiple signals that enable and disable one or more settings (e.g., a silent mode) at certain times (e.g., at the beginning of a performance a silent mode may be switched on, at the start of an intermission the silent mode may be switched off, at the end of an intermission the silent mode may be switched back on, etc) Similarly, a wireless signal transmitter 107 at a sporting event or concert could send several signals to turn a user device's light on and off at certain times, etc.

Each of the potentially multiple commands received before, during and/or after an event may be sent by the wireless signal transmitter(s) 107, the data server 105, and/or some other device. Each of the commands may be a command that is broadcast to all user devices at the event, a command that is unicast to a particular user device at the event, and/or a command that is multicast to a group of user devices at the event. Thus, an event organizer may be able to implement blanket user device policies, as well as grant exceptions to users and/or groups of users as necessary.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
   requesting, by a mobile device and from a server, encryption information for an event that a user of the mobile device is scheduled to attend;
   receiving, by the mobile device and from a wireless transmitter at a location of the event, a unicast signal comprising an encrypted command;
   decrypting, by the device and using the encryption information, the encrypted command, wherein the encrypted command comprises an instruction to change a setting of the mobile device; and
   changing, based on the instruction, the setting of the mobile device.

2. The method of claim 1, further comprising:
   prior to the changing of the setting, displaying a notification that the setting will be changed;
   receiving a confirmation from the user of the mobile device; and
   after the changing the setting, preventing the setting from being changed again for a duration of the event.

3. The method of claim 1, further comprising:
   in response to determining that the user of the mobile device is scheduled to attend the event, requesting, by the mobile device, permission to adjust the setting of the mobile device.

4. The method of claim 1, further comprising receiving the encryption information via a location-based push notification.

5. The method of claim 1, wherein the event is a flight, wherein the encryption information is requested by an application that runs on the mobile device and is associated with an airline company, and wherein the instruction to change the setting is an instruction to set the mobile device to an airplane mode.

6. The method of claim 1, wherein the event is a performance, wherein the encryption information is requested by a ticketing application that runs on the mobile device, and wherein the instruction to change the setting is an instruction to set the mobile device to silent.

7. The method of claim 1, where the unicast signal further comprises an address associated with the mobile device, and wherein the decrypting of the encrypted command comprises decrypting the encrypted command based on a determination that the address matches the mobile device.

8. The method of claim 1, wherein the unicast signal is an ultrasonic acoustic signal.

9. A computing device comprising:
   one or more processors; and
   memory storing instructions that, when executed by the one or more processors, cause the computing device to:
      request, from a server, encryption information for an event that a user of the computing device is scheduled to attend;
      store the encryption information;
      receive, from a wireless transmitter at a location of the event, a unicast signal comprising an encrypted command;
      decrypt, using the encryption information, the encrypted command, wherein the encrypted command comprises an instruction to change a setting of the computing device; and
      change, based on the instruction, the setting of the computing device.

10. The computing device of claim 9, wherein the event is a flight, and wherein the instruction to change the setting is an instruction to set the computing device to an airplane mode.

11. The computing device of claim 9, wherein the event is a performance, and wherein the instruction to change the setting is an instruction to set the computing device to silent.

12. The computing device of claim 9, wherein the instructions, when executed by the one or more processors, further cause the computing device to:
    prior to the changing of the setting, display a notification that the setting will be changed;
    receive a confirmation from the user of the computing device; and
    after the changing of the setting, prevent the setting from being changed again for a duration of the event.

13. The computing device of claim 9, wherein the unicast signal is an ultrasonic acoustic signal.

14. The computing device of claim 9, wherein the instructions, when executed by the one or more processors, further cause the computing device to receive the encryption information via a location-based push notification.

15. The computing device of claim 9, where the unicast signal further comprises an address associated with the computing device, and wherein the instructions, when executed by the one or more processors, cause the computing device to decrypt the encrypted command by decrypting the encrypted command based on a determination that the address matches the computing device.

16. A non-transitory computer-readable medium storing instructions that, when executed by one or more processors, cause a computing device to:
    request, from a server, encryption information for an event that a user of the computing device is scheduled to attend;
    receive, from a wireless transmitter at a location of the event, a unicast signal comprising an encrypted command;
    decrypt, using the encryption information, the encrypted command, wherein the encrypted command comprises an instruction to change a setting of the computing device; and
    change, based on the instruction, the setting of the computing device.

17. The non-transitory computer-readable medium of claim 16, wherein the event is a flight, and wherein the instruction to change the setting is an instruction to set the computing device to an airplane mode.

18. The non-transitory computer-readable medium of claim 16, wherein the event is a performance, and wherein the instruction to change the setting is an instruction to set the computing device to silent.

19. The non-transitory computer-readable medium of claim 16, wherein the instructions, when executed by the one or more processors, further cause the computing device to:
- prior to the changing of the setting, display a notification that the setting will be changed;
- receive a confirmation from the user of the computing device; and
- after the changing of the setting, prevent the setting from being changed again for a duration of the event.

20. The non-transitory computer-readable medium of claim 16, where the unicast signal further comprises an address associated with the computing device, and wherein the instructions, when executed by the one or more processors, cause the computing device to decrypt the encrypted command by decrypting the encrypted command based on a determination that the address matches the computing device.

* * * * *